United States Patent Office 3,455,986
Patented July 15, 1969

3,455,986
PROCESS FOR THE REDUCTIVE DIMERIZATION OF α,β-OLEFINIC COMPOUNDS
David Colin Jones, Runcorn, England, assignor to Imperial Chemical Industries Limited, Millbank, London, England, a corporation of Great Britain
No Drawing. Filed Nov. 12, 1965, Ser. No. 507,528
Claims priority, application Great Britain, Nov. 24, 1964, 47,783/64; May 4, 1965, 18,734/65; July 30, 1965, 32,700/65
Int. Cl. C07c *121/28;* B01k *1/00*
U.S. Cl. 260—465.8                    10 Claims

ABSTRACT OF THE DISCLOSURE

Process for the reductive dimerization of Michael acceptors, especially α,β-olefinic esters, amides or nitriles, in the liquid phase in the presence of an organic sulphoxide or sulphone, e.g., dimethyl sulphoxide. Reduction may be effected by means of amalgam or electrolytically. In this way acrylonitrile is converted to adiponitrile.

---

This invention relates to the reductive dimerisation of compounds which are acceptors in Michael reactions. It relates especially to the reductive dimerisation of acrylonitrile and dimerisable substituted derivatives thereof to produce adiponitrile and substituted derivatives thereof. By the term "acceptors in Michael reactions" we mean compounds containing a group of general formula

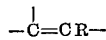

in which the R group activates the double bond. Examples of such compounds are listed in "Organic Name Reactions" by Krauch and Kunz 1964. John Wiley and Sons, p. 315, and in "Name Reactions in Organic Chemistry" by Surrey 1961, Academic Press, on pp 173 and 174. Such compounds are referred to hereinafter as "Michael Acceptors" and typical examples are α,β olefinic esters, amides and nitriles.

It has been suggested to reductively dimerise acrylonitrile to adiponitrile using either alkali metal amalgam in an aqueous medium or electrolytic reduction, but in simple processes of this kind the yields of adiponitrile both on starting materials and current are low due to the formation of hydrogen, propionitrile or polymers of acrylonitrile. We have found that the reaction can be performed in the presence of certain additives in the reaction mixture in some cases with improved yield.

Accordingly the present invention provides a process for the reductive dimerisation of dimerisable Michael Acceptors in the liquid phase which is carried out in the presence of an organic sulphoxide or sulphone.

By organic sulphoxide or sulphone we mean a compound of general formula

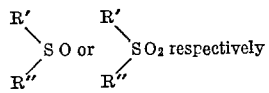

where R′, R″ represent hydrocarbon radicals or substituted derivatives thereof including aliphatic, cycloaliphatic, aromatic, aralkyl and alkaryl groups and hydrogen and where R′, R″ may be the same or different, and may be linked to each other to form a heterocycle containing the sulphur atom.

The sulphoxide or sulphone should not interfere with the hydrodimerisation reaction ro be attached to an undesirable extent by the reaction medium. In the hydrodimerisation of acrylonitrile for example using an amalgam process it should not be reduced by the amalgam or cyano-ethylated by the acrylonitrile.

The sulphoxide or sulphone is preferably capable of forming a homogeneous reaction mixture with the other components of the mixture (e.g. a liquid co-solvent for acrylonitrile and water). Examples of solvents which may be used are dimethylsulphoxide, tetramethylenesulphone, dimethylsulphone, di-phenylsulphoxide and di-phenylsulphone.

Examples of Michael acceptors to which the process of the present invention is applicable are α,β olefinic esters, amides and nitriles. These may be regarded as derivatives of acrylic acid and the invention is especially applicable to simple derivatives of acrylic acid (e.g. acrylamide, lower alkyl esters and acrylonitrile).

The process of the present invention is especially useful when applied to α,β olefinic nitriles with the production of alkylene dinitriles or substituted derivatives thereof. One example is in the reductive dimerisation of acrylonitrile or dimerisable substituted derivatives thereof to adiponitrile or substituted derivatives thereof. Within the term "substituted derivative of acrylonitrile" we wish to include acrylonitrile in which the hydrogen atoms are at least partially replaced, preferably by hydrocarbon radicals, especially aliphatic saturated or unsaturated radicals and substituted derivatives thereof.

Proportions of additive to acrylonitrile will vary somewhat according to the details of the process (e.g. the efficiency of the additive) but the additives appear to be beneficial over a wide range of relative concentrations. In the reductive dimerisation of acrylonitrile in the presence of dimethylsulphoxide, for example, good results are obtained with weight ratios of dimethylsulphoxide to acrylonitrile of approximately 20:1 but ratios between 1:1 and 100:1 can be employed with some variation of yield. The relative concentrations are preferably kept within such limits that the organic part of the reaction mixture remains homogeneous. The homogeneous reaction mixture does not of course include amalgam (when used) or insoluble products or by products which separate out. An excess by weight of additive over over acrylonitrile is conveniently used when acrylonitrile is being reductively dimerised. Other additives may be present in the reaction mixture depending again on the details of the process. For example in the reductive dimerisation of α,β olefinic nitriles it may be convenient to perform the process in the presence of an alkyl cyanide especially acetonitrile. The alkyl cyanide is added deliberately and is preferably present in the starting materials and this aspect of the invention does not include within its scope the incidental formation of alkyl cyanides as products or by-products of the reaction (e.g. propionitrile). In the reductive dimerisation of acrylonitrile not only does the presence of acetonitrile appear in some cases to increase yields but there is the further economic advantage of being able to use a crude or only partially purified product of a process for the manufacture of acrylonitrile (e.g. from propene, ammonia, oxygen and a catalyst) as a starting material, thus eliminating the difficult separation of acrylontrile from acetonitrile. Further details of the use of acrylontrile/acetonitrile mixtures may be found in copending U.S. patent application 454,723, now U.S. patent 3,356,708.

The reaction is preferably performed in the presence of a polymerisation inhibitor, for example p-nitrosodimethylaniline.

The reductive dimerisation may be performed using an alkali or alkaline earth metal amalgam in a medium capable of providing protons. Sodium or potassium amalgam is conveniently used in an aqueous medium. Although an aqueous medium is a convenient source of protons it should be noted that it is not necessary to have large quantities of water present and in fact it may be advantageous to restrict the water content to a small proportion of the total reaction mixture. Furthermore, other proton sources such as alcohols or anhydrous acid may be used. Using amalgam the pH of the reaction medium tends to rise as the amalgam is consumed. Preferably extremes of pH are avoided and good yields are obtained in the pH range between 2 and 13 and especially between 5 and 11. The pH may be controlled in several known ways e.g. by adding acids such as HCl, $H_2SO_4$, $CO_2$ or other inorganic and organic acids during the reaction, or by using a buffer system, for example a phosphate, borate, carbonate or bicarbonate solution.

Preferably the reaction mixture is kept cool in order to minimise undesired side-reactions such as polymerisation and in the reductive dimerisation of acrylonitrile temperatures in the range 0° C. to 30° C. give good results. Lower temperatures may be used, however, with loss of convenience or higher temperatures with loss of yield.

As an alternative to using amalgam the reductive dimerisation may be performed by subjecting the reaction mixture to electrolysis. A conducting medium is required for the electrolysis and this is conveniently obtained using an aqueous solution of an ionic salt (e.g. an alkali metal salt) but other conducting media may be used if desired. The electrodes should be reasonably resistant to attack by the reaction medium under the reaction conditions. The cathode material preferably has a high hydrogen overvoltage (e.g. mercury). Preferably extremes of pH are avoided, a pH within the range 4 to 12 and especially 6 to 10 being preferred. In the electrolytic process it is necessary for the reaction medium to have access to the cathodic regions.

Pressure is not critical and atmospheric pressure is convenient but increased pressures of acrylonitrile may be used if desired. The process of the present invention is readily adapted either for continuous or batch operation.

Using the process of the present invention it is found that significant yields of reductively dimerised product are obtained. For example, in the reductive dimerisation of acrylonitrile to adiponitrile using dimethylsulphoxide, yields of adiponitrile on acrylonitrile consumed are improved and in the amalgam process good yields of adiponitrile on active metal in the amalgam are obtained. In the electrolytic process adiponitrile is produced with high energy efficiency.

The amalgam process of the present invention, is conveniently performed in the laboratory in a stirred reaction mixture to which the amalgam is added at a controlled rate. Other materials may also be added at a controlled rate (e.g. acid to control pH or other components of the reaction mixture to maintain the relative proportions of these components at a desired level). Products may be separated from the reaction mixture by conventional means. For example, in the reductive dimerisation of acrylonitrile to adiponitrile using sodium amalgam and hydrochloric acid to control pH the reaction product may be filtered to remove inorganic sodium salts and then distilled to remove low boiling fractions such as acrylonitrile, water and any by-product, e.g. propionitrile which may be formed.

Then the residue is distilled under low pressure to separate solvent, e.g. dimethyl sulphoxide from adiponitrile. The adiponitrile can then be purified by further distillation or by techniques known to those skilled in the art.

The process of the present invention can also be performed in a compartment adjacent to, or forming a part of an electrolytic cell for the production of amalgam. In one such cell the cathode has as essential parts a layer of mercury supported by a membrane permeable to the electrolyte solution the cathode being interposed between (a) an aqueous solution of an alkali or alkaline earth metal hydroxide or salt which contains the anode and (b) the compartment containing the reaction medium in which the process of the present invention is being preformed.

Details of this arrangement may be found in copending U.S. patent application Ser. No. 454,723, now U.S. Patent 3,356,708.

The difunctional hydrodimerised products of the process of the present invention may be used as polymer intermediates among other uses. Adiponitrile for example may be reduced to hexamethylene diamine which is an intermediate in nylon manufacture.

Examples of the invention will now be described.

EXAMPLE 1

A reaction mixture consisting of 12 grams of acrylonitrile, 36 grams tetrahydrothiophen-1,1-dioxide and 25 grams of aqueous hydrochloric acid (containing 2.25 grams HCl) was stirred and maintained at 18° C. to 24° C. while 1550 grams of potassium amalgam (potassium content 0.57% by weight) were added over a period of 5 minutes.

The reaction mixture was separated from the mercury and analysed by gas liquid chromatography for adiponitrile, propionitrile and unchanged acrylonitrile.

The molar yield of adiponitrile, based on acrylonitrile consumed, was 74%. The molar yield of adiponitrile, based on the potassium content of the amalgam used, was 59%.

By way of comparison a reaction was carried out in the same way except that the sulphone was omitted. The molar yield of adiponitrile based on acrylonitrile consumed, was 61%. The molar yield of adiponitrile, based on the potassium content of the amalgam used, was 17%.

EXAMPLES 2–11

Experimental variables and results are listed in Table I, for a series of reductive dimerisations of acrylonitrile in the presence of dimethylsulphoxide. Experiments were performed in a 2 litre reaction vessel and the reaction mixture was stirred at 300 r.p.m. The pH was controlled by adding hydrochloric acid to neutralise the hydroxide formed during the reaction.

TABLE I.—REDUCTIVE DIMERISATION OF ACRYLONITRILE IN THE PRESENCE OF DIMETHYLSULPHOXIDE

| Example No. | Quantities of reactants (gm.) | | | Amalgam | | | Temp. (°C.) | Yield, Wt. percent ADN+PN | Percent efficiency on metal in amalgam, ADN | pH |
| | | | | Composition | | Rate of addition, ml./min. | | | | |
| | DMSO | ACN | $H_2O$ | Metal and wt. (gm.) | Percent metal | | | | | |
| --- | --- | --- | --- | --- | --- | --- | --- | --- | --- | --- |
| 2 | 85 | 90 | 45 | 20 (K) | 0.4 | 3.1 | −35 | 74 | 47 | Strongly alkaline. |
| 3 | 25 | 40 | 12 | 4.1 (K) | 0.3 | 0.67 | 0 | 57 | 54 | Do. |
| 4 | 85 | 90 | (1) | 15 (K) | 0.35 | 3.83 | −35 | 13 | 3 | Strongly acid. |
| 5 | 154 | 196 | 74 | 7.9 (K) | 0.29 | 1.9 | 0 | 17 | 24 | Strongly alkaline. |
| 6 | 95 | 60 | 45 | 5.0 (Na) | 0.28 | 1 | 0 | 65 | 37 | 2.5–7.5. |
| 7 | 160 | 60 | 5 | 5.0 (Na) | 0.28 | 1 | 0 | 95 | 74 | 5–7. |
| 8 | 180 | 61 | 5 | 5.0 (Na) | 0.31 | 1 | 0 | 94 | 83 | 5–7. |
| 9 | 180 | 60 | 5 | 5.0 (Na) | 0.31 | 1 | 0 | 94 | 81 | 7–9. |
| 10 | 180 | 60 | 5 | 4.3 (Na) | 0.29 | 1 | 0 | | | 1–2. |
| 11 | 205 | 20 | 20 | 7.4 (Na) | 0.3 | 1 | 5 | 99 | 80 | 8.9. |

[1] 45 ml. conc. HCl.

EXAMPLES 12-14

Experimental variables and results are quoted in Table II for a series of reductive dimerisations of acrylonitrile in the presence of dimethylsulphoxide and acetonitrile. Example 12 is for comparison with no acetonitrile present. Abbreviations have the same meaning as in Table I and MeCN=acetonitrile.

TABLE II

| Example No. | Starting Materials (g.) | | | | Product (g.) ADN | Percent wt. yield on Na |
|---|---|---|---|---|---|---|
| | ACN | H₂O | DMSO | MeCN | | |
| 12 | 20 | 20 | 205 | 0 | 9.2 | 80.5 |
| 13 | 20 | 20 | 205 | 1 | 9.1 | 80.5 |
| 14 | 20 | 20 | 205 | 10 | 9.55 | 84 |

Sodium (4.85 g.) was added to the reaction mixture in the form of a 0.3 wt. percent sodium mercury amalgam at a rate of 1 ml. per minute. pH was controlled between 7 and 11 by the addition of aqueous 2 N hydrochloric acid. Only traces of propionitrile were formed in all runs. It will be seen that the presence of acetonitrile did not decrease the yield of adiponitrile or the efficiency on sodium and in one case appears to increase the yield slightly. It is clear therefore that the presence of acetonitrile in the reaction mixture is not undesirable.

EXAMPLE 15

A mixture of 8.7 gms. of acrylonitrile, 20 gms. water, 6.5 gms. of lithium chloride was electrolysed between a platinum anode and a mercury cathode for 4½ hours at 0.1 amp. and 15 volts. Since this experiment was for comparison, no other compounds were added. Adiponitrile (0.03 gm.) and propionitrile (0.6 gm.) were obtained, representing a percentage yield of adioponitrile of 4.8 and a percentage current efficiency of 3.4.

EXAMPLE 16

Example 15 was repeated except that the process was performed in the presence of dimethylsulphoxide. 8.5 gms. of acrylonitrile, 20 gms. of water and 92 gms. of DMSO yielded 0.24 gm. of adiponitrile and 0.12 gm. of propionitrile representing a percentage weight yield of adiponitrile on acrylonitrile of 66.7 and a percentage current efficiency of 27.2.

EXAMPLE 17

Example 16 was repeated except that 34.2 gms. of acrylonitrile were used. This yielded 0.91 gm. of adiponitrile with a trace of propionitrile representing a percentage weight yield of adiponitrile on acrylonitrile of approximately 100 and a percentage current efficiency of approximately 100.

EXAMPLE 18

A reaction mixture was prepared consisting of 250 gms. acrylonitrile, 100 gms. diphenylsulphoxide and 5 gms. water was stirred and maintained at 0° C. while 2,000 gms. of 0.1 wt. percent sodium amalgam was added over 2 hours pH was controlled at 8–10 using 2 M HCl. Two layers formed in the reaction mixture due to the low solubility of diphenylsulphoxide in water. 1.49 gms. of adiponitrile were obtained by G.L.C. (analysis) and a trace of propionitrile representing a yield on acrylonitrile of 99% and on sodium of 32%. Approximately 100 p.p.m. p-nitrosodimethylaniline was present in Examples 1–18 as a polymerisation inhibitor.

EXAMPLE 19

100 mls. of 0.2% sodium analgam, prepared by the electrolysis of a sodium chloride solution, were run into a solution of 25 g. of acrylamide in 50 g. of water and 100 g. of dimethylsulphoxide over a period of 1 hour. The temperature was kept between 0 and 10° C. and the pH was controlled between 6 and 10 by the addition of dilute aqueous hydrochloric acid. The solution was allowed to stand for 30 mins. and the white precipitate of adipamide formed was filtered off, washed with water and dried. 3 g. of adipamide was formed, M.P. 218° C., mixed M.P. with pure adipamide 218° C.

*Analysis.*—Calcd. for adipamide, percent—C=50.0, H=8.33, N=19.4, O=22.2. Found, percent—C=50.6, H=8.21, N=19.1, O=22.1.

EXAMPLE 20

100 mls. of 0.19% sodium amalgam were run into a stirred solution of 40 g. of ethylacrylate in 50 g. of dimethylsulphoxide and 10 g. of water, the pH being controlled by the addition of carbon dioxide between 6 and 10. The temperature was maintained below 10° C. The water, ethyl acrylate and dimethylsulphoxide were distilled off under reduced pressure and the resulting residue boiled with ether. The ether extract was filtered, dried and the ether evaporated off. The resulting orange solution was fractionated and the fraction boiling at 246–249° C. collected. 2 g. of product were obtained.

*Analysis* for diethyl adipate.—Calcd., percent: C=59.4, H=8.9, O=31.7. Found, percent: C=59.1, H=8.7, O=31.0.

Using the process of the present invention the yield on starting materials and the current efficiency is generally improved in comparison with processes which do not employ the compounds used in the process of the present invention.

I claim:

1. In a process for the reductive dimerization of an α,β-olefinic compound selected from the group consisting of acrylonitrile, acrylamide and lower alkyl esters of acrylic acid to produce adiponitrile, adipamide and dilower alkyl adipates, respectively, in the liquid phase, by contacting said α,β-olefinic compound with an alkali metal or alkaline earth metal amalgam in a proton-providing medium, the improvement which comprises carrying out said reductive dimerization in the presence of an organic sulphoxide or sulphone additive selected from the group consisting of phenyl sulphoxides and sulphones and alkyl sulphoxides and sulphones, the ratio by weight of the said additive to the said α,β-olefinic compound falling within the range of 1:1 to 100:1.

2. The process of claim 1 wherein said reductive dimerization is carried out at a pH of 2 to 13 in an aqueous medium and at a temeprature below 50° C.

3. A process as claimed in claim 1 in which the additive is selected from the group consisting of lower alkyl sulphoxides and sulphones.

4. A process as claimed in claim 3 in which the additive is dimethylsulphoxide.

5. A process as claimed in claim 3 in which the additive is tetramethylene sulphone.

6. A process as claimed in claim 1 in which the nitrile is acrylonitrile and the product is adiponitrile.

7. A process as claimed in claim 1 when performed in the presence of an alkyl cyanide.

8. A process as claimed in claim 7 in which the alkyl cyanide is acetonitrile.

9. A process as claimed in claim 1 when performed in the presence of a polymerization inhibitor.

10. A process as claimed in claim 1 in which the pH is in the range of 2 to 13 and the pH is controlled by means of a buffer solution.

References Cited

UNITED STATES PATENTS

| 3,193,476 | 7/1965 | Baizer | 204—73 |
| 3,193,478 | 7/1965 | Baizer | 204—73 |
| 3,193,480 | 7/1965 | Baizer | 204—73 |
| 3,193,481 | 7/1965 | Baizer | 204—73 |
| 3,249,521 | 5/1966 | Baizer | 204—73 |

JOSEPH P. BRUST, Primary Examiner

U.S. Cl. X.R.

204—73, 74, 75; 260—465.1, 465.3, 485, 561